United States Patent [19]
Velásquez

[11] 3,894,703
[45] July 15, 1975

[54] ARTICULATING ROTOR SYSTEMS FOR HELICOPTERS AND THE LIKE

[76] Inventor: Carmen Jose Velásquez, 12637 S. Grevillea Ave., Hawthorne, Calif. 90250

[22] Filed: May 2, 1973

[21] Appl. No.: 356,507

[52] U.S. Cl. ............. 244/17.23; 416/121; 416/129; 416/148; 416/170
[51] Int. Cl. ........................................... B64c 27/10
[58] Field of Search.......... 244/17.25, 17.27, 17.19, 244/17.11, 17.23, 17.21, 17.17, 17.15, 17.13, 7 A, 7 R, 6; 416/170, 128, 124, 120, 121, 129

[56] References Cited
UNITED STATES PATENTS

| | | | |
|---|---|---|---|
| 1,356,534 | 10/1920 | Lemire | 416/121 |
| 1,589,658 | 6/1926 | Pescara | 244/7 R |
| 1,819,863 | 8/1931 | Bleecker | 244/17.19 |
| 2,404,014 | 7/1946 | Thornes | 244/17.25 |
| 2,434,276 | 1/1948 | Laskowitz | 416/121 |
| 2,518,623 | 8/1950 | Judge | 244/17.17 |
| 2,605,608 | 8/1952 | Barclay, Jr. | 244/17.19 X |
| 2,806,662 | 9/1957 | Yonkers | 244/17.19 |

FOREIGN PATENTS OR APPLICATIONS

| | | | |
|---|---|---|---|
| 722,339 | 3/1932 | France | 416/128 |
| 172,026 | 7/1960 | Sweden | 244/17.23 |

Primary Examiner—Trygve M. Blix
Assistant Examiner—Paul E. Sauberer
Attorney, Agent, or Firm—Robert J. Schaap

[57] ABSTRACT

A helicopter which has a cab and a source of motive power associated with the cab. A boom extending rearwardly from the cab carries a rudder which is pivotal about a horizontal axis to provide directional control of the helicopter. A drive mechanism receives a first rotating rotor shaft which is rotated by the source of motive power. A second rotor shaft extends concentrically with the first rotor shaft and each carry a rotor blade at their upper ends. The drive mechanism is designed to impart rotation to the second rotor shaft in such a manner that each of the rotor shafts rotate in opposite direction but at the same rotational rate of speed. A universal joint is operatively associated with the drive mechanism to permit the rotor shafts and the rotor blades to shift through a vertical plane in a direction longitudinal to the cab.

5 Claims, 8 Drawing Figures

ARTICULATING ROTOR SYSTEMS FOR HELICOPTERS AND THE LIKE

BACKGROUND OF THE INVENTION

This invention relates in general to certain new and useful improvements in helicopters, and more particularly, to drive mechanisms and articulating rotor systems for helicopters and the like.

In recent years, helicopters have received increased attention as a mode of travel, and due to the wide versatility of these devices, they have begun to replace other forms of travel, and particularly other forms of air travel. Thus, helicopters have now been used to convey passengers and cargo which were previously transported by other air vehicles, such as airplanes, and other land travel vehicles, such as trains, trucks and the like.

Due to the increased use of helicopters, there has been a very substantial research and development effort directed toward improving the efficiency of operation of helicopters. Most of these efforts have essentially revolved about improvements in the components, such as the drive motor, the rotor blades or like subsystems in the helicopter. However, very little research and development activity has been directed to improving the overall principles of operation of the helicopter, and in like manner, little effort has been directed to obviating certain of the operational deficiencies in helicopters.

There are several forms of construction used in helicopters, but all of these forms of construction essentially rely upon a cab or cabin used for the retention of people and/or cargo, a source of motor power such as a piston engine, a jet engine, or the like, and a vertically extending rotor shaft, which carries a rotating blade or rotor. The rotating shaft and rotor are designed to impart both a horizontal force vector and a vertical force vector. Thus, by articulating the blades per-se about the rotor shaft, a forward force vector can be achieved in combination with the upward force vector. Thus, the pilot can control the attitude of the helicopter by merely balancing the forward and vertically upward force vector components, in order to achieve the desired lift and forward speed. In addition, a tail rotor is often provided in most helicopters in order to provide stability, and to overcome counter-rotational forces to which the helicopter may otherwise be subjected.

There have been other attempts to use dual rotor blades in order to increase forward movement and lift capabilities in the helicopter. These dual rotor systems have not proved to be terribly effective inasmuch as they are difficult for the pilot to operate and furthermore, they rely upon a rather complex articulating system, which materially increases the overall cost of the helicopter. In addition, these dual operating rotor blade systems have oftentimes been found to upset the structural balance which permits stability of the helicopter in flight. Cosequently, the dual bladed rotor system has not been widely accepted and adopted.

The present invention overcomes these and other problems in the provision of a unique drive mechanism which receives a first rotating shaft, the latter having the rotation imparted by a source of motive power. The drive mechanism enables the impartation of rotation to a second rotor shaft which is coaxial with the first rotor shaft, in such a manner that each of the rotor shafts rotate in opposite directions at the same rotational rate of speed. Furthermore, a universal mechanism permits the rotor shafts and the rotor blades carried at the upper ends thereof to be shifted through a vertical plane in a direction longitudinal to the cab. In this way, the operator of the helicopter can obtain the desired vertical lifting power and forward movement. A boom extending rearwardly from the cab carries a rudder which is pivotal about a horizontal axis and which provides directional control of the helicopter.

It is therefore the primary object of the present invention to provide a helicopter which includes a unique drive mechanism permitting angulated shifting movement of a vertically extending rotor shaft through a vertical plane in order to obtain a desired balance between a forward force vector and an upward force vector to thereby enable a desired directional attitude of the helicopter.

It is another object of the present invention to provide a helicopter of the type stated, which employs a tail rudder which is pivotal about a horizontal axis in order to provide directional change to the helicopter, and which thereby eliminates the need of a tail rotor.

It is a further object of the present invention to provide a helicopter of the type stated which employs dual rotor shafts, each carrying an individual rotor blade and which rotor shafts and respective blades rotate in opposite directions, but at the same rotational speed.

It is also an object of the present invention to provide a helicopter of the type stated, which includes an unique drive means to enable rotation of a pair of concentric rotor shafts in opposite directions and at the same rate of rotational speed, and which also permits angulatable movement through a relatively vertical plane in a longitudinal direction with respect to the cab of the helicopter.

It is another salient object of the present invention to provide a method of controlling the flight attitude of a helicopter by regulating the degree of angulated movement of a rotor shaft and a rotor carried thereby, and regulating the tilting movement of a rudder about a horizontal axis in order to provide directional change.

It is yet another object of the present invention to provide a helicopter of the type stated which is highly efficient in its operation, and which can be constructed at a relatively low cost on a mass production basis.

With the above and other objects in view, my invention resides in the novel features of form, construction, arrangement, and combination of parts presently described and pointed out in the claims.

GENERAL DESCRIPTION

In general terms, the present invention can be described as a helicopter which comprises a cab having a source of motive power, and first and second coaxially extending rotor shafts, which extend upwardly from the cab. First and second rotor blades are carried respectively at the upper ends of the first and second rotor shafts, and are powered for rotation through this source of motive power. Means are operatively associated with the first and second rotor shaft to permit angulating movement of the shaft in a vertical plane which is longitudinal with respect to the cab. Retroactive gear containing means are provided to permit the first and second shafts to rotate in opposite directions with respect to each other, but at the same angular rotational speed. As used herein, the term "retroactive" refers to a gear containing means which enables oppositely directed rotation of two concentric shafts.

The helicopter can be characterized in further detail in that the means which permits the angulated movement is a universal joint. The retroactive gear containing means generally will comprise a first gear member rotatable with the first rotor shaft, and a second gear member rotatable with the second gear shaft. In addition, a meshing gear arrangement is interposed between the first and second gear members in such a manner as to cause the first and second rotor shafts to rotate in opposite directions about their respective central axes.

In addition, the helicopter will contain a boom which extends rearwardly from the cab, and a rudder which is carried by this boom. The rudder is angulatable about a relatively horizontal axis to thereby enable directional change of the cab. A first powered means, preferably in the form a pneumatic or hydraulic ram, is operatively connected to the rotor shafts to cause the angulated movement of the shafts. A second powered means, preferably in a form of a pneumatic or hydraulic ram is operatively connected to the rudder to cause an angulated movement of the rudder.

The invention can also be described as an improvement in helicopters of this type which include a cab and a source of motive power disposed in relationship to the cab. In the improvement, a boom extends outwardly from the cab and the rudder, as aforementioned is operatively carried by the boom and angulatable in relatively horizontal axis to permit the directional change. A drive mechanism is operatively coupled to the source of motive power and in this case, a shaft means is operatively connected to the drive mechanism for imparting rotation to the shaft means. At least one rotor blade is carried by the shaft means and is rotatable thereby. However, as previously described, a pair of rotor shafts are employed and an individual rotor blade is carried by each of the shafts. Furthermore, a universal means is operatively associated with the drive mechanism to permit the arcuate angulated movement of the shaft means and the rotor blade, through a vertical plane relatively common to the horizontal axis as aforementioned.

In further detail, this improvement can be characterized in that a cooperating shaft means is operatively associated with the first named shaft means and is also operatively associated with the drive mechanism for imparting rotation to the cooperating shaft means. As also stated, an additional rotor blade is carried by the cooperating shaft means and is rotatable thereby. In addition, a retroactive means is provided in the drive mechanism for rotating the first named shaft means and the rotor blades carried thereby in opposite directions and at the same rotational rate of speed.

The improvement of the helicopter of the present invention can also be described as including a universal means, which is operatively connected to the shaft means, a first drive shaft which is operatively connected to the universal means, and which is rotatable about its central axis in a first angular direction. A first rotor blade is carried by this first drive shaft and is rotatable therewith. A second drive shaft is coaxial with the first drive shaft, and the gear means as described above, is operatively interposed between the first drive shaft and the second drive shaft for causing the second drive shaft to be rotatable about its central axis in a second angular direction. The second rotor blade is likewise carried by this second drive shaft and is rotatable therewith.

In this case, the rotor shafts are concentric as aforesaid, and essentially formed an outer quill shaft and an interior shaft; the outer quill shaft essentially being hollow in its construction. The interior shaft extends above the outer quill shaft and in this way, each are provided with rotor blades at their upper ends.

This drive mechanism can be described as a mechanism for transferring rotational force to first and second coaxially extending drive shafts. The drive mechanism would generally comprise an outer housing and having first bearing means to receive and support the first of the drive shafts. Second bearing means would also be located in the housing to receive and support the second of the drive shafts extending within and through the first drive shaft. A first gear is fixedly located on the first drive shaft, and a second gear is fixedly located on the second drive shaft. A third gear is located about the drive shafts and disposed in meshing engagement with the first and second gears to impart opposite rotational force to the second drive shaft with respect to the first drive shaft. Finally, third bearing means is located in the housing to support the third gear within the housing.

This drive mechanism can be described in further detail in that a plurality of third gears are employed and a plurality of side plates are disposed about the third gears and the third bearing means to support the third bearing means. In addition, a support block is disposed about the first and second drive shafts and is located in abutting engagement with the side plates. Further, a sleeve forms part of the housing and is provided with elongated grooves to hold these side plates.

The present invention can also be described as a method of controlling a flight attitude of helicopters of the type which have a cab and a source of power, and an upward extending rotor shaft. A rotor blade is powered for rotation through this source of motive power. In this case, the method would comprise the shifting of a rudder extending rearwardly from the cab about a relatively horizontal axis to enable directional change of the cab. The method also includes shifting of the rotor shaft forwardly with respect to the cab through a vertical plane passing through the central axis of the rotor shaft. In this way, a tilting movement of the rotor blades is caused, where the rotor blades previously existed in a relatively horizontal plane passing through the rotor blades. As the blades shift forward, the helicopter will obtain a forward drive vector. When the rotor shaft is shifted to its relatively vertical position and hence the rotor blades carried thereby are located in a substantially horizontal plane, a substantially pure upward drive vector is obtained for the helicopter. In this case, the amount of forward drive vector and upward drive vector are balanced with respect to the speed of rotation of the rotor blades in order to obtain a proper flight attitude for the helicopter.

The method of the present invention can be further characterized in that the method includes simultaneously shifting the second rotor blade, which is concentric with the first named rotor shaft through the vertical plane. In this case, a tilting movement of the second rotor blade carried by the second rotor shaft also occurs in timed relation to the tilting movement of the first rotor blade. In addition, the first rotor blade and the second rotor blade are rotated in opposite directions, but at substantially the same rate of angular rotational speed. The method would also include actuating fluid ram devices for shifting the rotor blade and the rotor shaft.

FIGURES

Having thus described the invention in general terms, reference will now be made to the accompanying drawings (seven sheets) in which:

DETAILED DESCRIPTION

Referring now in more detail and by reference characters to the drawings, which illustrate a preferred embodiment of the present invention, A designates a helicopter comprising a cab 10 or so-called "bubble" which is generally sized and designed for the transport of people or various forms of cargo. The cab 10 is conventionally provided on opposite sides thereof with a pair of skids or similar support members 12 for engagement with the ground or other supporting surface, although it should be understood that wheels or other forms of ground contact means could be employed. Mounted on the top wall of the cab 10 is a source of motive power, such as a conventional jet engine 14, although other forms of motive power, such as piston engines or the like could be used in accordance with the present invention.

Figure 1:
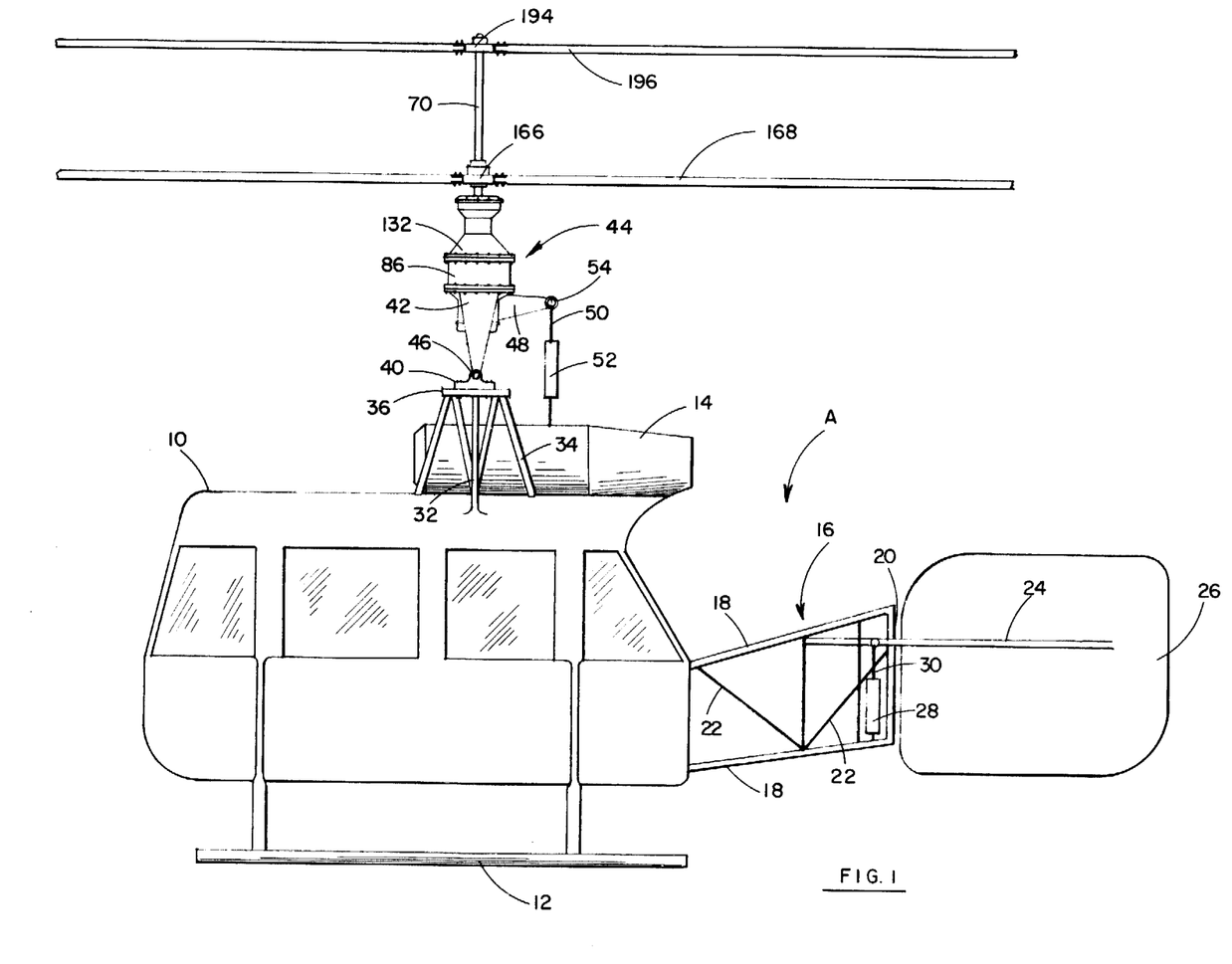
FIG. 1 is a side elevational view of a helicopter constructed in accordance with and embodying the present invention.
Figure 3:
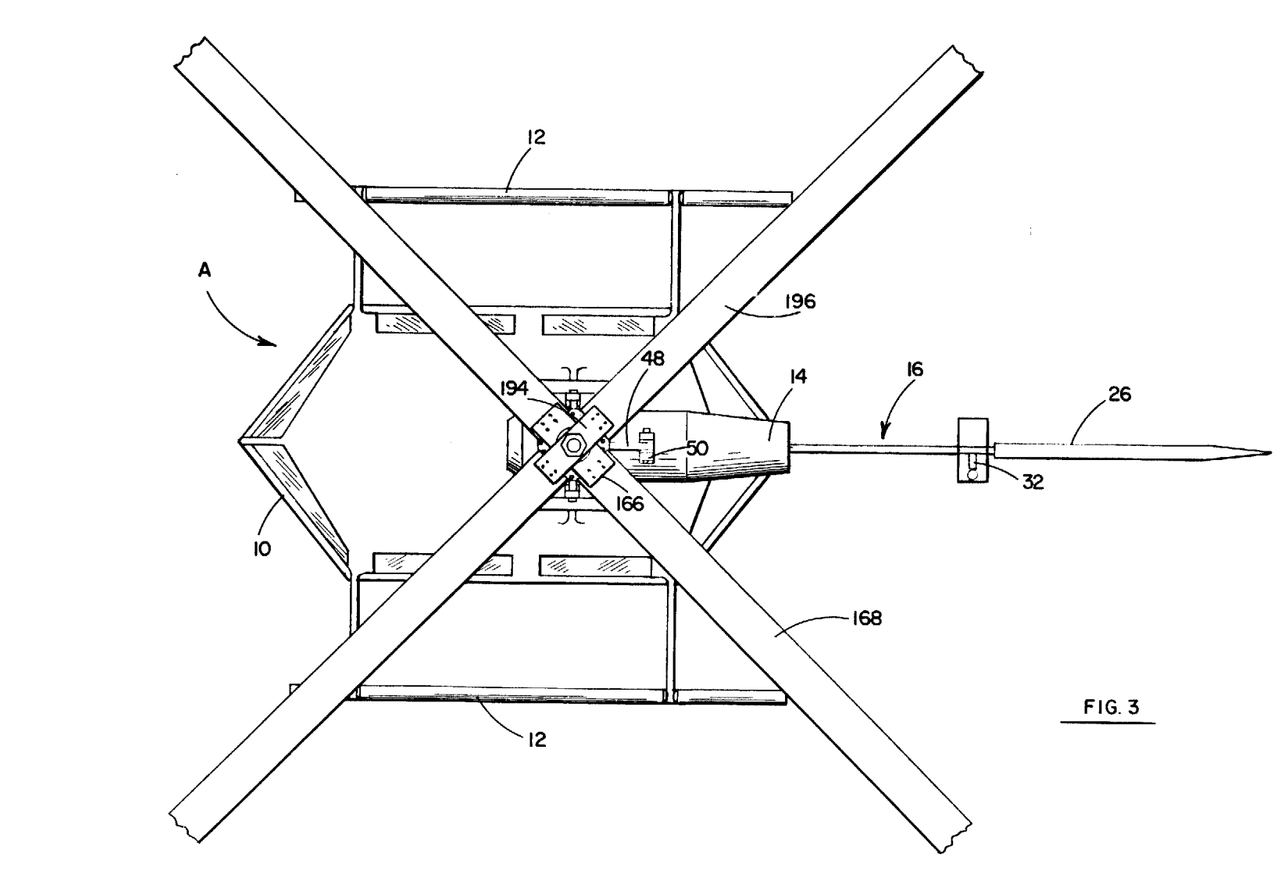
FIG. 3 is a top plan view of the helicopter of FIG. 1.
Figure 4:
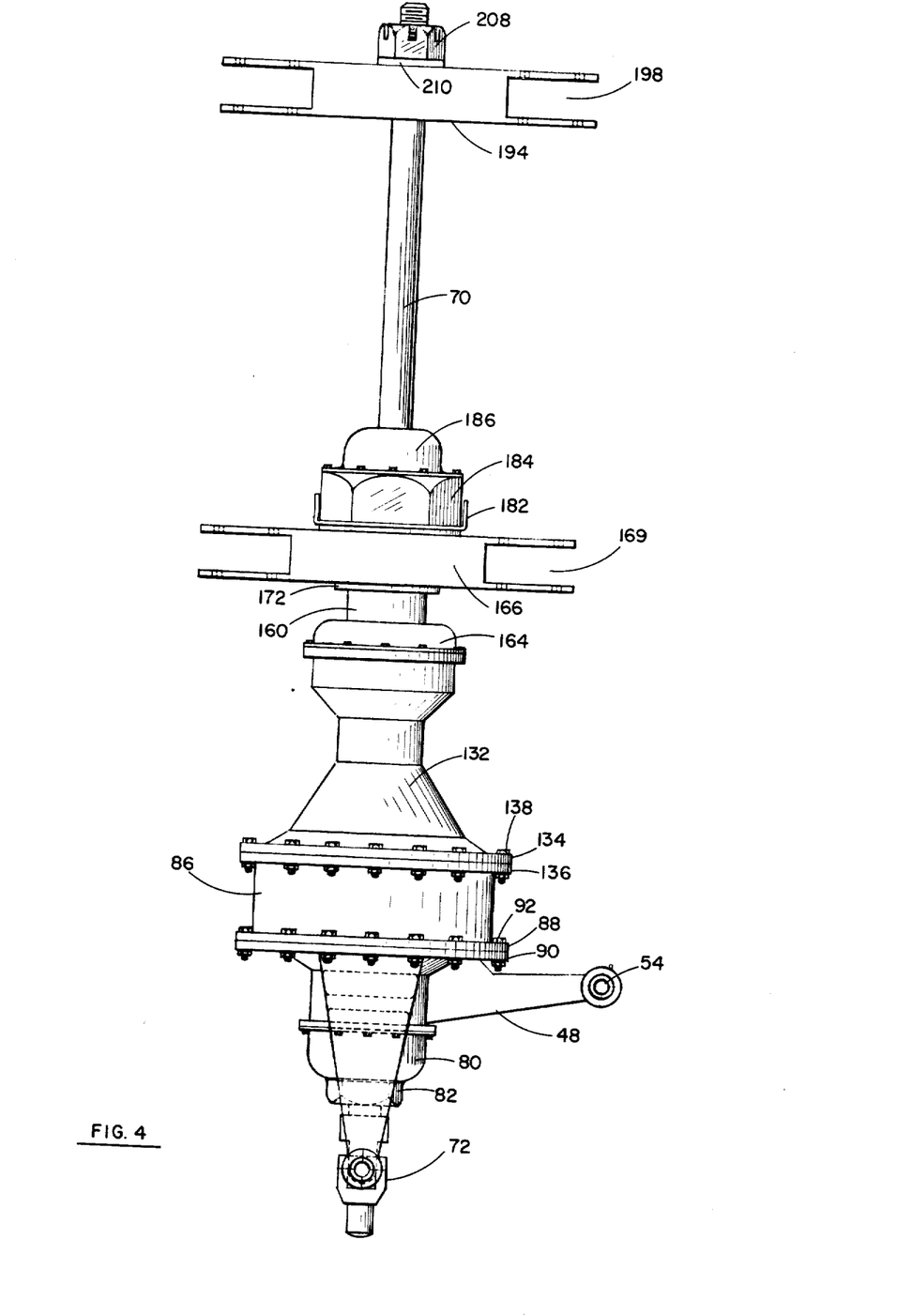
FIG. 4 is a side elevational view partially broken away of a portion of the drive mechanism and rotor shaft assembly of the helicopter of FIG. 1.

Rigidly mounted on and extending rearwardly from the cab 10, reference being made to FIGS. 1 and 3, is a tail boom 16, which is comprised of a pair of vertically spaced-apart rearwardly extending support bars 18 connected at their outer ends by means of a vertically disposed connecting bar 20. In addition, the tail boom 16 will generally include several reinforcing rods 22 for added structural stability. Extending rearwardly from the tail boom 16 is a substantially horizontally located rudder support rod 24, which is adapted for pivotal movement about its horizontal longitudinal axis with respect to the tail boom 16. Rigidly secured to and carried by the rudder support rod 24 is a relatively flat, vertically disposed rudder 26, in the manner as illustrated in FIGS. 1 and 3.

As the rudder support rod 24 is rotated, the rudder 26 will be pivoted through a substantially horizontal axis concident with the longitudinal axis of the rudder support rod 24. A fluid drive cylinder 28 is also mounted on the tail boom 16 in the manner as illustrated in FIG. 1, and is provided with a shiftable piston rod 30. The upper end of the piston rod 30 is pivotably connected to the rudder support rod 24 by means of a connecting bracket or coupling 32. In this way, when the fluid cylinder 28 is actuated, it will either extend or retract the piston rod 30 thereby causing a pivotal movement of the rudder support rod 24 through the action of the coupling 32.

Normally, the cylinder 28 will be a hydraulically actuated cylinder, although a pneumatic cylinder could also be employed. In this respect, other forms of drive means can also be utilized to rotate the rudder support rod 24 and hence the rudder 26. The fluid cylinder 28 will be controlled by an operator from a pilot's control panel (not shown) in the interior of the cab 10, through a suitable fluid control circuit (also not shown). In this respect the cylinder 28 would preferably be a double acting cylinder with fluid delivery tubes conventionally connected to both ports on the fluid cylinder 28.

The rudder 26 is mounted on the rudder support rod 24 by any conventional means, such as rivets, bolts, or the like. The rudder 26 should be mounted so that a substantially greater portion of its surface area lies below the rudder support rod 24. The rudder 26 is designed to provide directional movement in a relatively horizontal plane to the helicopter A through actuation by the pilot. Thus, it has been found in connection with the present invention, that rotation of the rudder 26 about its horizontal axis is highly effective in providing directional control in a horizontal plane for the helicopter A.

Generally, the components of the tail boom 16 and the rudder 26 may be constructed of any of a wide variety of structural materials, such as metals including aluminum or the like, or plastics or reinforced plastic composite materials. In like manner, the cab 10 and the skids 12 may also be formed of any structural metals normally used in the manufacture of airframe construction. Other components which may normally be found in helicopters and like devices, such as stabilizers, air brake flaps, or the like have not been illustrated since these components generally are conventional in their construction.

Figure 2:
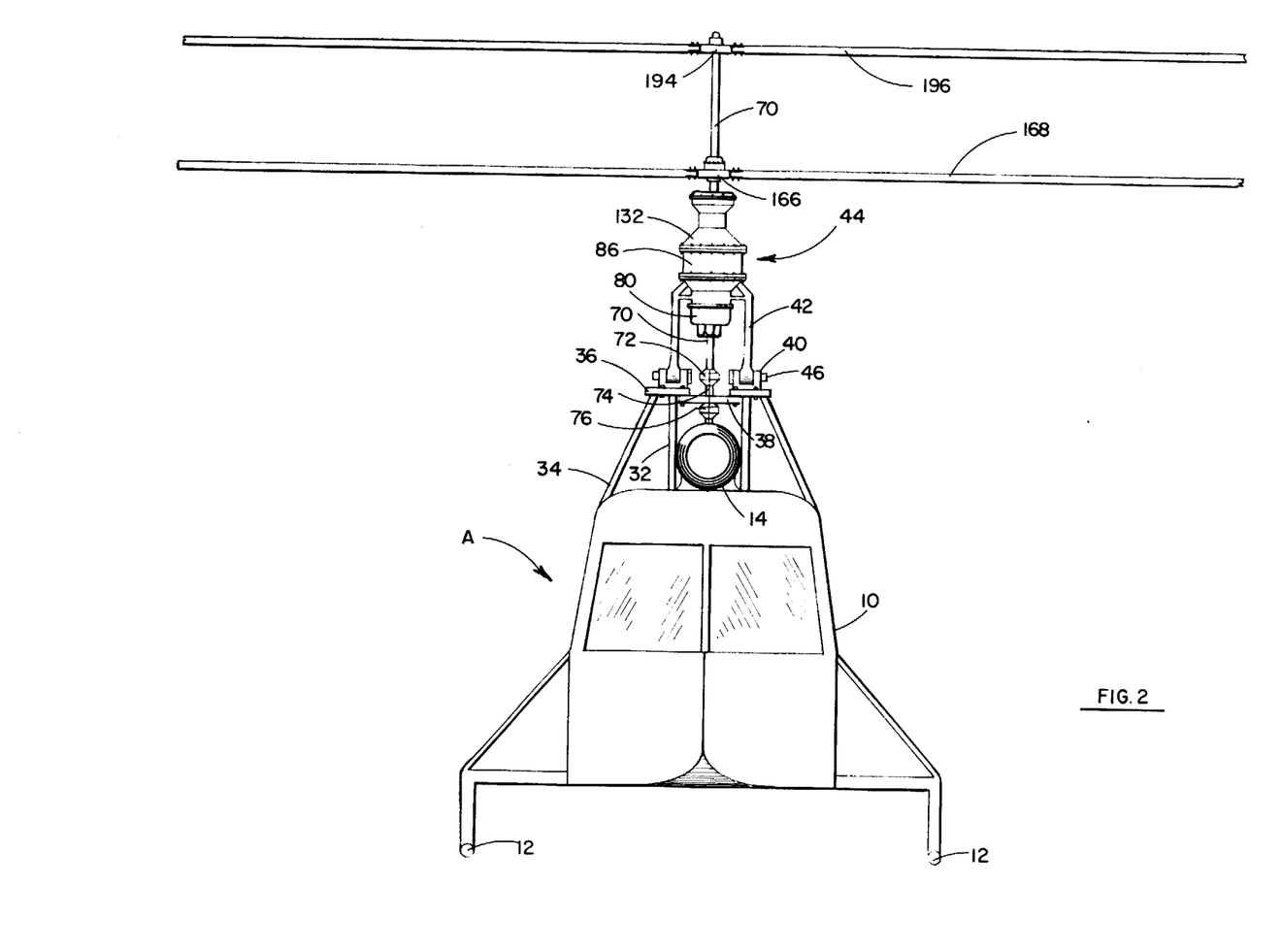
FIG. 2 is a front elevational view of the helicopter of FIG. 1.

Mounted on the top wall of the cab 10 are a pair of laterally spaced upstanding brackets 32, which are further reinforced by angularly located struts 34 and each include a top mounting plate 36. Extending between the pair of laterally spaced mounting plates 36 and being rigidly secured thereto is a connecting plate 38, in the manner as illustrated in FIG. 2.

The top mounting plates 36 are each provided with laterally spaced U-shaped mounting brackets 40 for pivotally mounting support arms or braces 42 which carry a drive mechanism 44. The support braces 42 are each integrally provided with an enlarged hollow tubular base 43 at their lower ends and which are sized to be retained in the U-shaped mounting brackets 40. The pivotal connection between the braces 42 and the mounting brackets 40 is provided by pivot pins 46 which extend through the tubular bases 43.

Extending rearwardly from the drive mechanism 44, in the manner as illustrated in FIGSS. 1 and 3, is a flange plate 48. Pivotally connected to the outer end of the flange plate 48 is a piston 50 actuatable by means of a fluid cylinder 52, the latter being, in turn, rigidly attached to the jet engine 14. The upper end of the piston rod 50 is pivotally connected to the rearward end of the flange plate 48 by means of a pivot pin 54.

The fluid cylinder 52 is preferably the same type of cylinder as the fluid cylinder 28, and may be either a hydraulic cylinder or a pneumatic cylinder. In like manner the cylinder 52 would preferably be a double acting cylinder connected to the fluid control system of the helicopter. The cylinder 52 would also be actuable by a pilot through the pilot's control panel inside of the cab 10. Thus, when the pilot actuates the cylinder 52 to extend the piston 50, the entire drive mechanism 44 will be pivoted in a forwardly direction in a vertical plane, and when the pilot retracts the piston 50, the entire drive mechanism 44 will be shifted rearwardly in a vertical plane with respect to the cab 10, all for reasons which will presently more fully appear.

Figure 5:
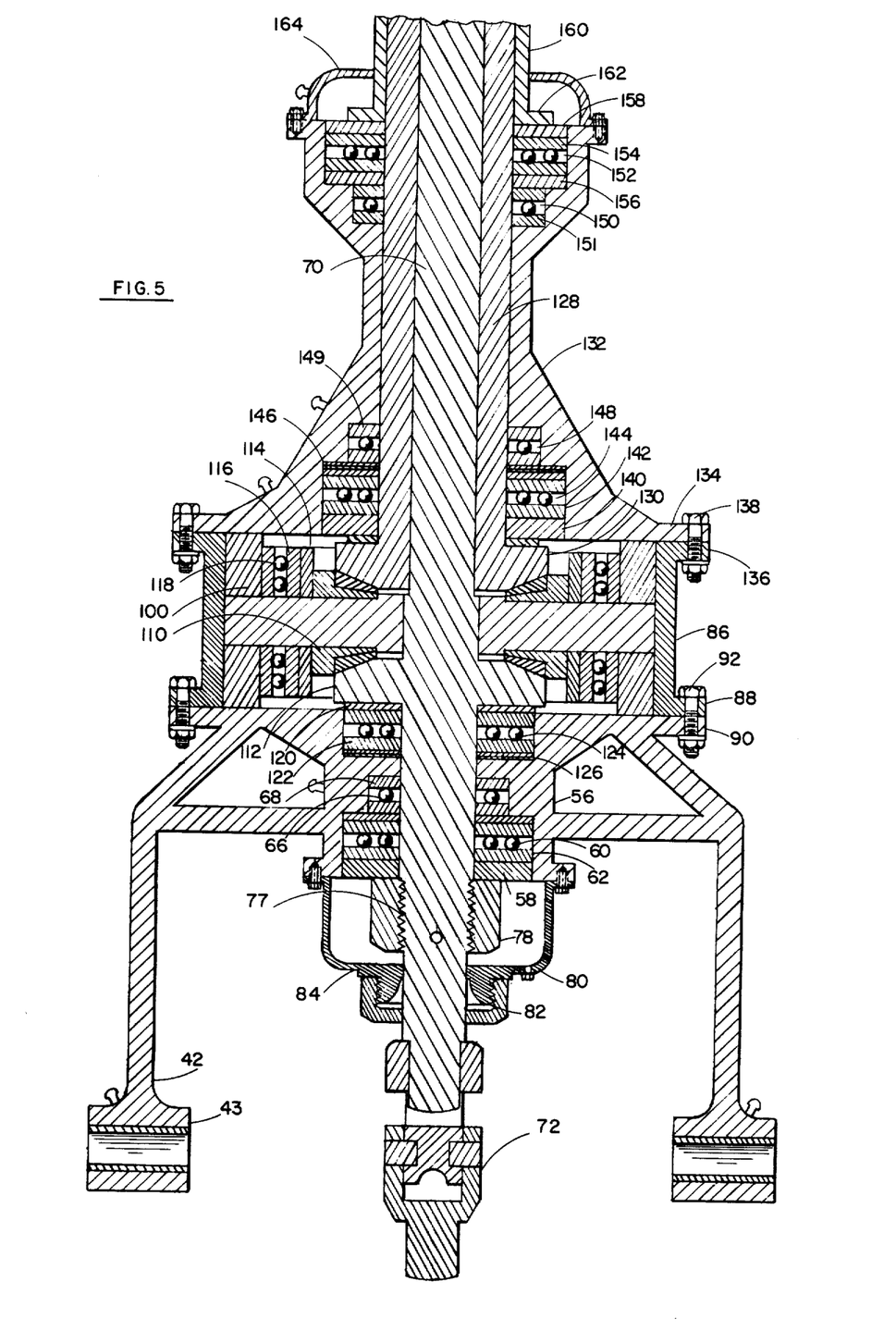
FIG. 5 is a vertical sectional view showing the interior of the drive mechanism of FIG. 4.

The drive mechanism 44 is more fully illustrated in FIGS. 4–8 of the drawings, and generally comprises a lower base housing 56, which is integrally formed with the upper ends of the vertically disposed arms or braces 42. The base housing 56 is internally bored to accommodate a thrust washer 58 which in turn supports thrust bearings 60 having bearing races 62. A relatively thick washer 64 is located on the upper surface of the upper bearing race 62 and supports radial bearings 66 having bearing races 68. These bearings 60 and 66 are designed to rotatably support a main rotor shaft 70, which extends axially through the drive mechanism 44 in the manner as illustrated in FIG. 5.

The main rotor shaft 70 is connected through a universal joint 72 to a main drive shaft 74 which, in turn, receives power from the jet engine 14, and is coupled thereto through a lower universal joint 76. The upper universal joint 72 should be located so that the pivot point created thereby is coincident with the central axis of the pivot pins 46. While it is desirable to maintain an alignment of these pivotal connections, this alignment is not absolutely critical and even a variance of a quarter of an inch or more between the pivot point created by the universal joint 72 and the pivot pins 46 will not produce any deleterious results. The lower universal joint 76 should be located as close as possible to the jet engine 14 so as to maintain the greatest distance on the drive shaft 74 between the two universal joints 72 and 76. The lower universal joint 76 is designed to absorb all of the twists and sudden jerks which the engine may generate and thereby prevent the forces from these jerks and twists from being imparted to the main drive shaft 74 and hence the main rotor shaft 70. The upper universal joint 72 is designed to permit a forward and reverse tilting of the main drive mechanism 44, for reasons which will presently more fully appear.

The lower end of the main rotor shaft 70 is provided with an externally threadedly section 77 and threadedly secured to this threaded section 77 is a retaining nut 78. Also secured to the lower end of the base housing 56 and enclosing the threaded nut 78 is an oil pan 80, which may be filled with a suitable lubricating oil or similar lubricating fluid. The oil pan 80 is likewise centrally bored in order to accommodate the lower end of the main rotor shaft 70, and is also provided with a grease seal 82 to prevent any fluid leakage. In this case, a special packing made of fibrous asbestos is highly effective for use as the seal. A suitable sealing gasket 84 would also be located between the seal 82 and the oil pan 80, in the manner as illustrated in FIG. 5.

Secured to the lower base housing 56 is a cylindrical intermediate housing 86 which is integrally provided with an outwardly struck lower annular flange 88 for mounting to a matching flange 90 integrally formed with the base housing 56. A plurality of circumferentially spaced bolts 92 are fitted within apertures 93 formed in the annular flange 88 and mating apertures in the annular flange 90 to rigidly secure the intermediate housing 86 to the base housing 56.

Figure 7:
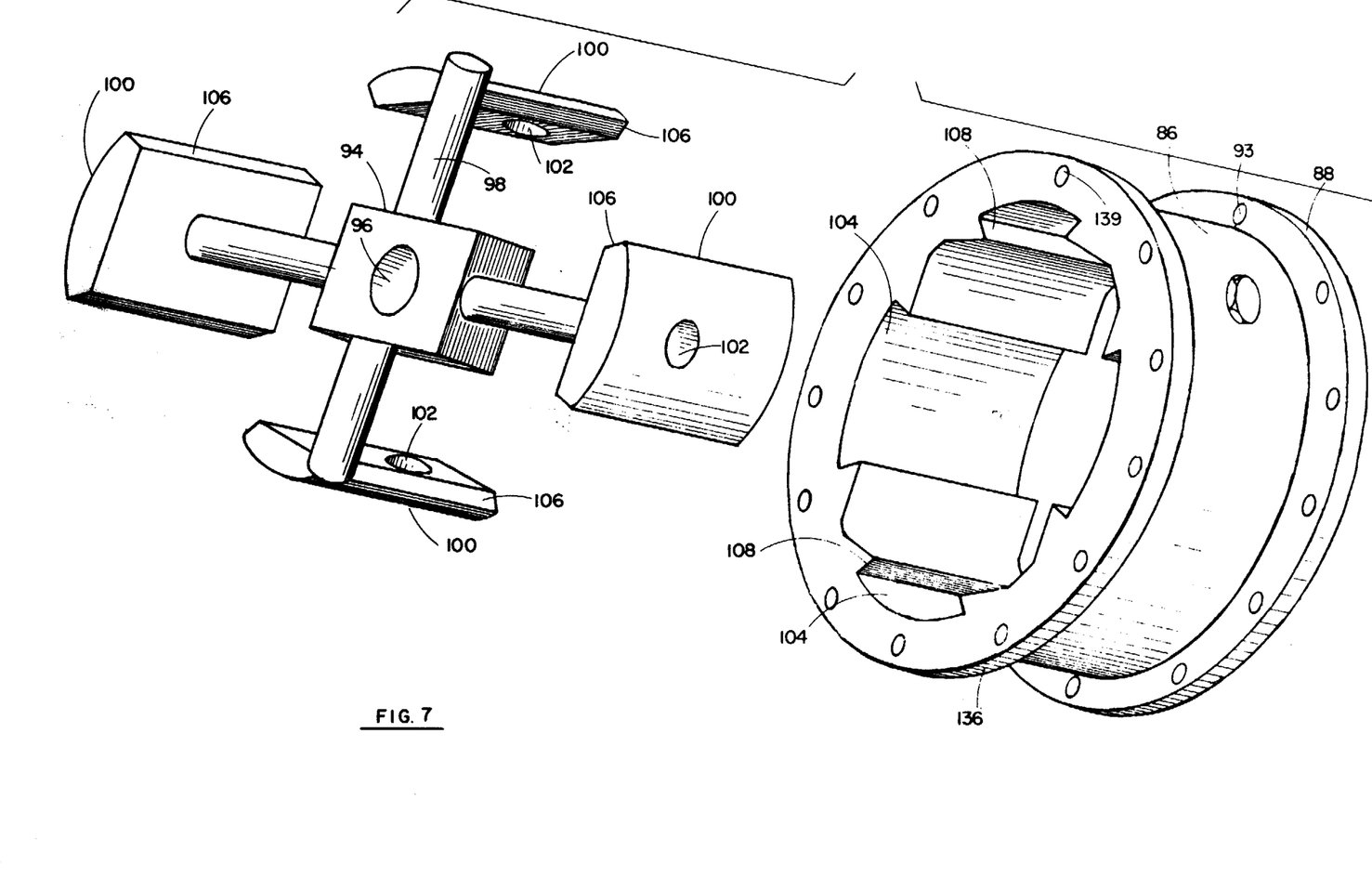
FIG. 7 is a perspective view showing a portion of the interior of the drive mechanism of FIG. 5.

Located within the intermediate housing 86 is a horizontally positioned retaining block 94 which is provided with a vertically disposed central aperture 96 for rotatably receiving the main rotor shaft 70. Extending outwardly from the retaining block 94 in a substantially horizontal plane are four circumferentially spaced retaining rods 98, in the manner as illustrated in FIGS. 5 and 7. By further reference to FIG. 7, it can be observed that the four rods 98 are spaced approximately 90° apart from each other. Mounted on the outer ends of each of the rods 98 are side plates 100 which are also provided with apertures 102 to receive the outer ends of the rods 98. This entire assembly is fitted within the intermediate housing 86 in the manner as illustrated in FIG. 5.

The housing 86 is preferably cast or otherwise formed of aluminum or any other structural metal used in air-frame construction. The housing 86 is also fabricated in such manner that it is provided with a series of four circumferentially spaced grooves 104 which are sized to snuggly receive the side plates 100. In this respect, it can be observed that the side plates 100 are provided with beveled edges 106 for mating with like beveled edges 108 formed in the housing 86. In this way, the horizontally positioned retaining block 94 and the side plates 100 will not rotate within the intermediate housing 86. Furthermore, the side plates have a vertical dimension substantially equal to the vertical dimension of the intermediate housing 86 and therefore will not shift vertically within the housing 86.

Located upon each of the four horizontally disposed retaining rods 98 for rotatable movement with respect thereto are bevel gears or so-called "spider gears" 110. These spider gears 110 are sized to mate with a similar spider gear 112 integrally formed on the main rotor shaft 70, in the manner as illustrated in FIG. 5. In this connection, it should be observed that the spider gear 112 could also be constructed in the form of a cylindrical ring and rigidly secured to the main rotor shaft 70 for rotation therewith by means of cotter pins or like fastening elements. The vertically disposed walls of the spider gears 110 are relatively flat and bear against thrust washers 114, which are, in turn, located against the bearing races 116 of thrust bearings 118. The thrust washers 114 and the thrust bearings 118 are located on each of the retaining shafts 98 and retained in place by means of the side plates 100 in the manner as illustrated in FIG. 5.

The mating gear 112 which is "frozen to, e.g., fixedly secured to the rotor shaft 70 for rotation therewith, is supported by one or more washers 120, which bears against an upper race 122 of roller bearings 124. The lower bearing race 122 is supported against washers 126. The roller bearings 124 and their races 122, along with the washers 120 and 126 define one of the important areas where correct clearance is needed so as to maintain proper meshing engagement between the bevel gears 110 and the bevel gear 112 on the rotor shaft 70. In this respect, the washers 120 and the washers 126 both serve as shims, and the number of washers 120 and 126 or their relative thicknesses can be adjusted in order to provide the desired amount of clearance.

Concentrically disposed about the main rotor shaft 70 is a quill shaft 128 which serves as an auxiliary rotor shaft. Integrally formed with the rotor shaft 128 at its lower end is a bevel gear or spider gear 130, which also meshes with the bevel gears 110, in the manner as illustrated in FIG. 5 of the drawings. Again, it should be observed that the bevel gear 130 could be constructed as a single element, and rigidly mounted to or otherwise frozen to the lower end of the auxiliary rotor shaft 128 for rotation therewith.

Mounted on the upper end of the intermediate housing 86 is an upper housing 132 which is integrally provided with an outwardly struck lower annular flange plate 134 for matching engagement with an upper flange plate 136 integrally formed on the intermediate housing 86. A plurality of circumferentially spaced bolts 138 are fitted within apertures 139 circumferentially spaced around the annular flange 134 and mating apertures in the flange 136 to rigidly secure the upper housing 132 to the intermediate housing 86.

The upper housing 132 is also centrally bored in order to accommodate a plurality of one or more thrust washers 140 which bear against the upper surface of the bevel gear 130. The upper surface of the thrust washers 140 is engaged with the lower race 142 of roller bearings 144. Additionally disposed on the other race 142 of the roller bearings 144 are additional washers 146. In like manner, roller bearings 148 having bearing races 149 are located above the washers 146. The area defined by the roller bearings 148, the thrust bearings 144, and the washers 146 define another area in which correct clearance is needed. In this repsect, one or more of the washers 146, which also serve as shims, can be removed in order to provide the correct amount of pressure against the bevel gear 130 to thereby maintain proper meshing engagement between the bevel gear 130 and the bevel gears 110.

The upper end of the upper housing 132 is enlarged and also internally centrally bored to accommodate roller bearings 150 having bearing races 151 and a thrust bearing 152 having bearing races 154. The lower race 154 of the thrust bearing 152 and the upper race 151 of the roller bearings 150 are separated by a thrust washer 156, much in the same manner as the construction of the thrust bearing 60 and the roller bearing 66. Disposed upon the upper race 156 of the thrust bearing 152 is another thrust washer 158.

An axially extending support tube 160 extends about the auxiliary rotor shaft 128 and is integrally provided at its lower end with an outwardly struck annular flange 162. The lower face of this flange 162 bears against the upper thrust washer 158, in the manner as illustrated in FIG. 5. Furthermore, an upper grease cap 164 is secured to the upper end of the upper housing 132, and provides a space for the retention of grease or other lubricating liquid. This grease cap 164 as well as the oil pan 80 will also serve to prevent atmospheric debris from entering into the drive mechanism 44.

The support tube 160 is constructed with proper thickness to support the weight of the rotors (to be hereinafter described) in such manner that undue force will not be placed upon the main rotor shaft 70 and the auxiliary shaft 128. In this way, it is possible to maintain a proper degree of clearance between that bevel gears 110, 112, and 130 to thereby maintain proper meshing engagement.

By reference to FIG. 6, it can be observed that the auxiliary rotor shaft 128 terminates some distance below the upper end of the main rotor shaft 70. Mounted on the upper end of the auxiliary rotor shaft 128 and being rotatable therewith is a rotor mounting hub 166, which carries a pair of outwardly extending rotor blades 168. The rotor mounting hub 166 is constructed in the form of a relatively thick plate having a pair of opposed elongated slots 169 which are sized to snuggly accommodate the inner ends of the rotor blades 168 and which are rigidly retained therein by means of bolts 170. The mounting hub 166 bears against an upper relatively thick washer 172 disposed about the auxiliary rotor shaft 128 and located against the mounting hub 166. Furthermore, the rotor mounting hub 166 is centrally bored to accommodate the upper end of the auxiliary rotor shaft 128, and is provided with a plurality of circumferentially spaced radial inwardly extending keys 174 which fit within matching keys 176 formed within the upper end of the auxiliary rotor shaft 128.

The auxiliary rotor shaft 128 is provided at its upper end with an externally threaded section 177 and threadedly secured thereto is a locking washer 178 which bears against a flat washer 180, the latter being disposed in engagement with the upper surface of the rotor mounting hub 166. The annular peripheral portion of the locking washer 178 is struck upwardly to form an annular ring 182 which bears against a locking nut 184, also threadedly secured to the threaded section 177 at the upper end of the auxiliary rotor shaft 128. A grease cap 186 is also secured to the upper end of the locking nut 184, and retained thereon by means of bolts 188, in order to form a grease pocket for a retention of a lubricating liquid. Finally, the locking nut 184 is centrally apertured at its upper end to retain radial bearings 190 and a locking ring 192, in the manner as illustrated in FIG. 6.

Figures 6, 8:
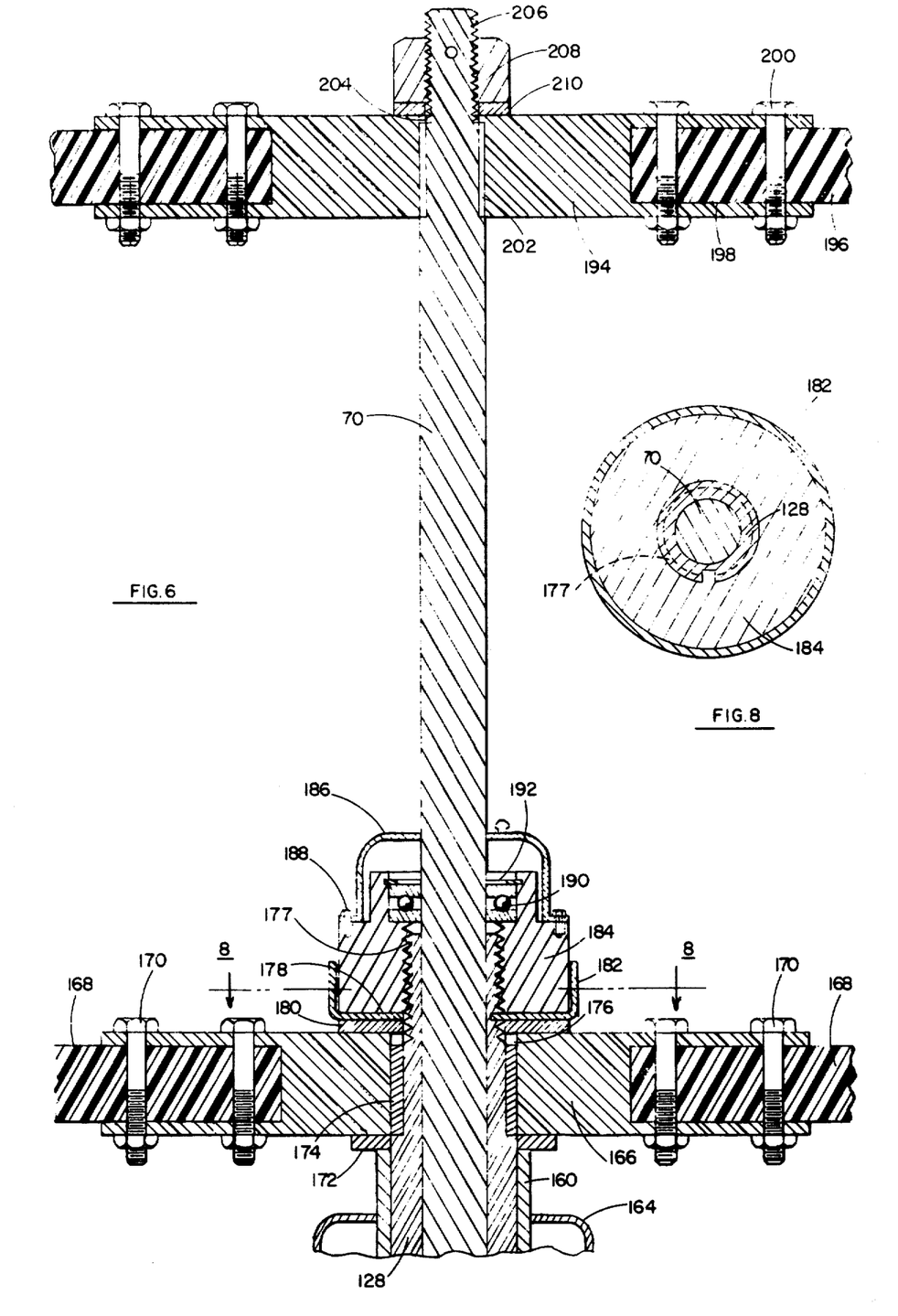
FIG. 6 is a vertical sectional view, similar to FIG. 5, and showing the upper portion of the drive mechanism and rotor shaft assembly.
FIG. 8 is a horizontal sectional view taken along Line 8—8 of FIG. 6.

As indicated previously, the main rotor shaft 70 extends upwardly above the auxiliary rotor shaft 128, in the manner as illustrated in FIGS. 1, 2 and 6. Also mounted on the upper end of the main rotor shaft 70 is a rotor mounting hub 194 which carries a pair of outwardly extending rotor blades 196. The rotor blades 196 are similarly fitted within opposed outwardly presented slots 198, and retained therein by means of bolts 200. The mounting hub 194 is similarly centrally bored to accommodate the upper end of the main rotor shaft 70, and is provided with a plurality of circumferentially spaced inwardly extending keys 202, which fit within keyways 204 formed in the shaft 70. The uppermost end of the main rotor shaft 70 is also provided with an externally threaded section 206 for retention of a locking nut 208, and a washer 210, in the manner as also illustrated in FIG. 6 of the drawings.

The rotor blades 168 and 196 may be constructed of any of a wide variety of materials, such as structural metals including aluminum or the like. In a more preferred form of construction, the rotor blades 168 are preferably formed of reinforced plastic composite materials, such as, for example, a fiberglass-epoxy resin composition. The internal construction of the rotor blades is not critical to the present invention and the blades may be constructed in any of a variety of art recognized procedures. In addition, while the means to mount the rotor blades to the shafts as described herein is the preferred form, any other root end attachment could be used.

By further reference to FIG. 5, it can be seen that as the main drive shaft 74 rotates, it will rotate therewith the main rotor shaft 70. The rotor shaft 70 is suitably retained within the drive mechanism 44 for rotatable movement by the various bearings 60, 66 and 124. As the main rotor shaft rotates, for example, in a clockwise direction, the bevel gear 112 rotatable therewith will mesh with the bevel gear 110 located within the intermediate housing 86. As this occurs, the bevel gear 130 mounted on the lower end of the auxiliary shaft 128 and which is also in meshing engagement with the bevel gears 110, will rotate in a counter-clockwise direction thereby causing the auxiliary rotor shaft 128 to rotate in a counter-clockwise direction. Thus, the rotor blades 168 will rotate in a counter-clockwise direction as the rotor blades 196 rotate in a clockwise direction. From the above, it can be observed that the rotor shaft 128 and the rotor blades 168 carried therewith, will also rotate in an opposite direction with respect to the rotor shaft 170 and the rotor blades 196 carried therewith. Furthermore, the gear ratio between the various bevel gears 112, 110, and 130 is selected so that the rotor shaft 70 and the rotor blade 196 will rotate at approximately the same speed as the rotor shaft 128 and the rotor blade 168 carried therewith.

The universal joint 72 permits a complete angulated movement in both the forward and rearward direction with respect to the longitudinal axis of the cab 10 about the various pivot pins 46. It can be observed that as the entire drive mechanism 44 is shifted either foreardly or rearwardly, reference being made to FIGS. 1 and 3, the rotor shafts 70 and 128 as well as the respective rotor blades 196 and 168 will also shift either forwardly or rearwardly, under control of the pilot in the cab 10. This shifting movement is permitted through the action of the universal joint 72. Furthermore, even as these rotor shafts pivot, the rotatable driving force will still be maintained on the main rotor shaft 70 and hence the auxiliary rotor shaft 128.

In accordance with the above outlined construction, the pilot of the helicopter A, can shift or articulate the rotor shaft and hence the blades carried thereby in a forward direction in order to obtain a forward force vector. By carefully balancing the degree of angulated movement, the pilot can maintain the proper balance of the forward force vector and an upward force vector in order to maintain the proper attitude of the helicopter. Thus, by merely maintaining the rotor shafts 70 and 128 in a substantially vertical position, the helicopter A will only have a vertical lift. However, by shifting the various rotor shafts 70 and 128 and hence the rotor blades 168 and 196 carried therewith forwardly, a forward force vector can be obtained. It has been found in connection with the present invention, that it is now possible to shift the rotor shafts 70 and 128 as much as 20° or more from the vertical in order to obtain a fairly substantial forward force vector. This was not otherwise obtainable in the other various prior art systems and therefore, the drive mechanism described herein has provided a very significant advantage to the helicopter of the present invention. Since the main rotor shaft 70 and the auxiliary rotor shaft 128 are suitably journaled for rotation in both ideally located radial and thrust bearings, high performance with a relatively friction free construction is achieved. The oil pans 80 and 164 which contain a suitable lubricating fluid provide sufficient lubrication throughout the entire drive mechanism. Furthermore, the universal joints 72 and 76 will provide for rotation of the two rotor shafts in a manner which is relatively free of any vibrations resulting from operation of the jet engine 14.

By virtue of the above-outline construction, it can be seen that the drive mechanism 44, as well as the remaining components of the helicopter A, can be easily and rapidly disassembled for purposed of overhaul and/or maintenance. Furthermore, the components which have been used in the construction of the drive mechanism 44 have been designed so that they can be easily manufactured on a mass production basis. In this respect, most of the components in the drive mechanism 44 as well as the reamining portions of the helicopter A, can be suitably constructed from structural metals normally used in air-frame construction and drive mechanisms for aircraft. However, it should also be understood that the components in the drive mechanism as well as the rotor shafts could be formed of any of a wide variety of materials, which will provide essentially the same structural characteristics as aluminum or the like, and include, for example, molded plastics or reinformed composite parts.

By virtue of using a dual rotor blade system of the type described, and which rotor blade system is tiltable through a vertical plane in order to provide both horizontal force vectors and vertical force vectors, it is possible to eliminate the stabilizer rotor normally provided at the tail of the helicopter. In this case, it is now possible to provide a complete control over helicopter attitude through means of a rudder 26 in combination with the tilting action of the rotor blades. Furthermore, it is not necessary to articulate the blades per-se about the rotor shafts, which was previously required in other helicopter systems.

Thus, there has been illustrated and described a novel helicopter construction which fulfills all of the objects and advantages sought therefore. Many changes, modifications, variations, and other uses and applications of the helicopter construction and the drive mechanism, and various components therein, will become apparent to those skilled in the art after considering this specification and the accompanying drawings. All such changes, modifications, variations, and other uses and applications which do not depart from the spirit and scope of the invention, are deemed to be covered by the invention which is limited only by the following claims.

Having thus described my invention, what I desire to claim and secure by letters patent is:

1. A helicopter comprising a cab, a source of power operatively mounted with respect to said cab, a first rotor shaft extending generally upwardly with respect to said cab, a second coaxially extending rotor shaft extending generally upwardly with respect to said cab, and being concentric with said first rotor shaft, first and second rotor blades respectively carried at the upper ends of said first and second rotor shafts and powered for rotation through said source of power and said shafts, universal means operatively associated with at least said first rotor shaft to permit angulated movement of said first and second rotor shafts in a vertical plane longitudinally with respect to said cab, retroactive gear containing drive means to permit said first and second rotor shafts to rotate in opposite directions with respect to each other but at the same angular rotational speed, said gear containing drive means comprising a casing mounted with respect to said cab, said casing having an interior chamber formed by an interior side wall, means forming at least one first retaining groove in said interior side wall, means forming at least one second retaining groove in said interior side wall, a mounting plate disposed about said first rotor shaft, a first retaining rod extending from said mounting plate and projecting toward said first retaining groove, a second retaining rod extending from said mounting plate and projecting toward said second retaining groove, a first gear disposed within said casing and being fixed to and rotatable with said first rotor shaft, a second gear located at the lower end of said second rotor shaft and being fixed to and rotatable therewith and being disposed within said casing, and a meshing gear arrangement located within said casing and being interposed between said first and second gears in such manner to cause said first and second rotor shafts to rotate in opposite directions about their respective central axes, a first bearing means in said casing to receive and support said first rotor shaft, a second bearing means in said casing to receive and support said second rotor shaft, third bearing means in said casing to support said meshing gear arrangement, a first retaining plate fixedly secured to the outer end of said first retaining rod and fitting within said first retaining groove, said first retaining plate supporting a portion of said third bearing means, and a second retaining plate fixedly secured to the outer end of said second retaining rod and fitting within said second retaining groove, said second retaining plate also supporting another portion of said third bearing means.

2. The helicopter of claim 1 further characterized in that the universal means to permit angulated movement is a universal joint which is located between said retroactive gear containing drive means and said source of power.

3. The helicopter of claim 1 further characterized in that a boom extends rearwardly from said cab, a rudder support rod extends rearwardly from said boom, and a rudder is carried by said rudder support rod in such manner that the rudder is angulatable about a relatively horizontal axis enabling directional change of said cab.

4. The helicopter of claim 1 further characterized in that said meshing gear arrangement comprises at least one third gear in meshing engagement with said first gear and at least one fourth gear in meshing engagement with said second gear, and means connecting said third and fourth gears so that they are rotatable together.

5. The helicopter of claim 1 further characterized in that first powered means is operatively connected to said rotor shafts to cause said angulated movement of said shafts, a rudder is operatively connected to said cab for shifting movement with respect thereto, and a second powered means is operatively connected to said rudder to cause angulated movement of said rudder.

* * * * *